US010905045B2

(12) United States Patent
Garrett

(10) Patent No.: US 10,905,045 B2
(45) Date of Patent: Feb. 2, 2021

(54) AUTOMATIC CHOPPER PAN CONTROL

(71) Applicant: CNH Industrial America LLC, New Holland, PA (US)

(72) Inventor: Robert J. Garrett, Conestoga, PA (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 16/652,012

(22) PCT Filed: Sep. 28, 2018

(86) PCT No.: PCT/US2018/053435
§ 371 (c)(1),
(2) Date: Mar. 27, 2020

(87) PCT Pub. No.: WO2019/067906
PCT Pub. Date: Apr. 4, 2019

(65) Prior Publication Data
US 2020/0281118 A1 Sep. 10, 2020

Related U.S. Application Data

(60) Provisional application No. 62/564,403, filed on Sep. 28, 2017.

(51) Int. Cl.
*A01D 41/12* (2006.01)
*A01F 12/40* (2006.01)
(Continued)

(52) U.S. Cl.
CPC .......... *A01D 41/1243* (2013.01); *A01F 12/40* (2013.01); *A01D 41/06* (2013.01);
(Continued)

(58) Field of Classification Search
CPC ................ A01D 41/06; A01D 41/1243; A01D 41/1273; A01F 7/062; A01F 7/065;
(Continued)

(56) References Cited

U.S. PATENT DOCUMENTS 3,115,142 A  12/1963  Kepkay
4,360,998 A  11/1982  Somes
(Continued)

FOREIGN PATENT DOCUMENTS

EP  2965615 A1  1/2016

OTHER PUBLICATIONS

International Search Report and Written Opinion for International Application No. PCT/US2018/053435 dated Mar. 19, 2019 (13 pages).

*Primary Examiner* — Robert E Pezzuto
(74) *Attorney, Agent, or Firm* — Peter Zacharias; Patrick Sheldrake

(57) ABSTRACT

A combine (10) having a feeder housing (20) for receiving harvesting crop, a separating system (24) for threshing the harvested crop to produce grain and residue, at least one of a yield monitor or a loss monitor, a crop cleaning system (26) for separating the grain from the residue, a residue chopper (114) for chopping the separated residue, an automated chopper pan (116) positioned h below the residue chopper (114), the automated chopper pan (114) having adjustable perforations, and a controller coupled to the at least one of the yield monitor or the loss monitor. The controller is configured to determine at least one of throughput from the yield monitor or loss from the loss monitor, compare the at least one of throughput or loss to respective throughput thresholds or loss thresholds, and control the automated chopper pan (116) to adjust the perforations based on the threshold comparison.

20 Claims, 12 Drawing Sheets

(51) Int. Cl.
   *A01F 29/09*      (2010.01)
   *A01F 12/18*      (2006.01)
   *A01D 41/06*      (2006.01)
   *A01D 41/127*     (2006.01)

(52) U.S. Cl.
   CPC .......... *A01D 41/1273* (2013.01); *A01F 12/18* (2013.01); *A01F 29/095* (2013.01)

(58) Field of Classification Search
   CPC .......... A01F 12/40; A01F 12/56; A01F 12/18; A01F 12/444; A01F 12/446; A01F 29/095
   USPC ................. 460/85, 90, 101, 111, 112, 145
   See application file for complete search history.

(56) References Cited

U.S. PATENT DOCUMENTS

| | | |
|---|---|---|
| 5,542,883 A | 8/1996 | Cruson |
| 6,056,639 A * | 5/2000 | Gryspeerdt ............. A01F 12/44 460/101 |
| 7,648,413 B2 | 1/2010 | Duquesne et al. |
| 9,693,506 B2 * | 7/2017 | De Smet ................. A01F 12/32 |
| 10,085,378 B2 * | 10/2018 | Farley ................ A01D 41/1243 |
| 2012/0056024 A1 | 3/2012 | Isaac et al. |
| 2015/0038201 A1 | 2/2015 | Brinkmann et al. |

* cited by examiner

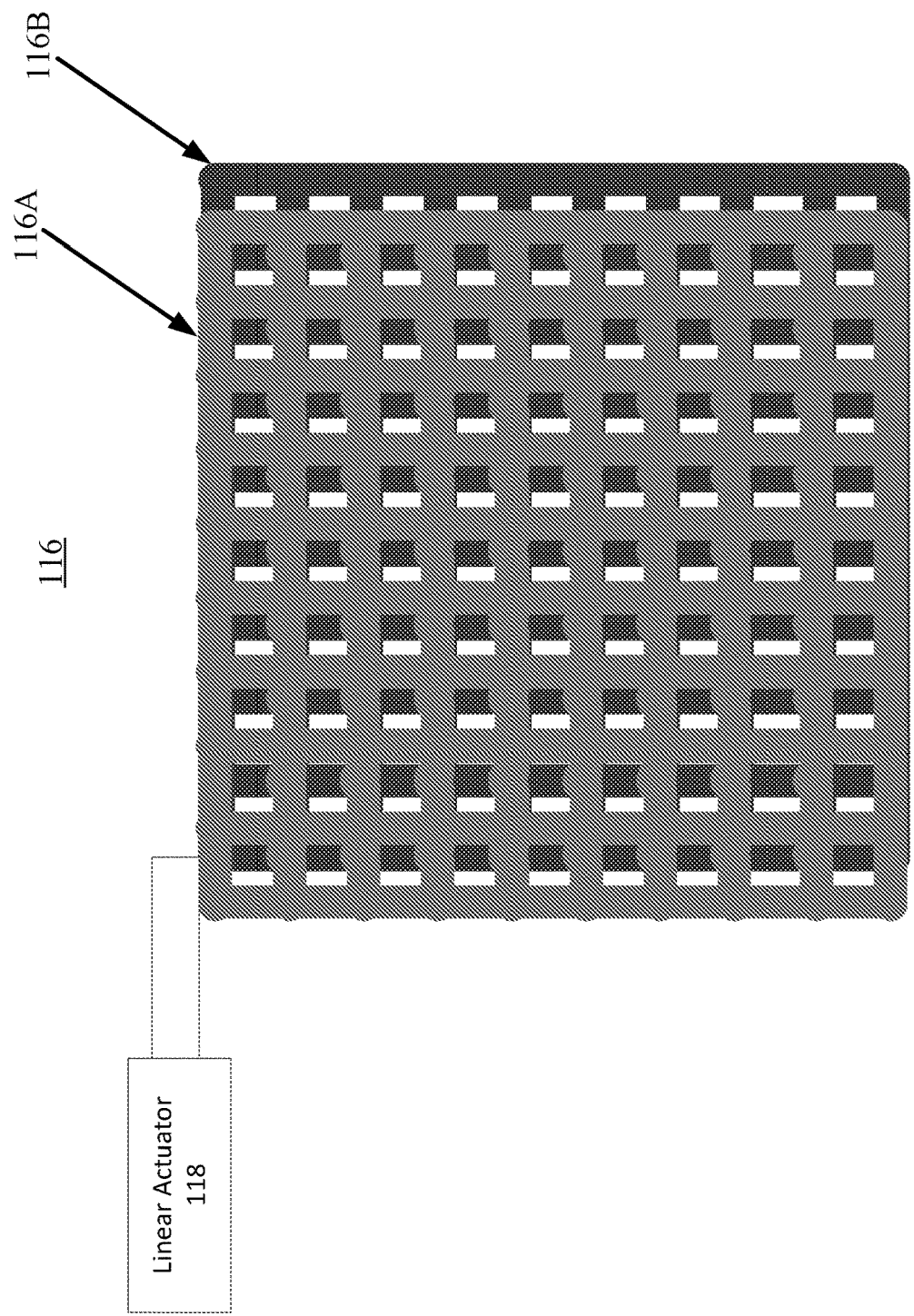

AUTOMATIC CHOPPER PAN CONTROL

FIELD OF THE INVENTION

The invention relates to a combine that automatically controls opening and closing of a chopper pan to maximize grain throughput, while maintaining grain loss below an acceptable level.

BACKGROUND OF THE INVENTION

Harvesters (e.g., combines) are used to harvest crops. Operations performed by these combines include threshing and separating grain from crop residue. Ideally, the grain falls through perforated pans into a cleaning system to be collected. However, some grain is accidentally transferred to the residue system. The residue system typically includes a chopper and a perforated pan that allows any remaining grain to fall into the cleaning system rather than being expelled from the combine with the residue. One problem is that some residue also falls through the perforated pan and into the cleaning system. Conventional combines have no means of automatically adjusting this perforated pan. In a scenario where the pan should be adjusted, the operator would have to stop the combine and manually insert or extract a blocking panel that allows or prevents crop from falling through the perforations and into the cleaning system.

SUMMARY OF THE INVENTION

An embodiment includes a combine having a feeder housing for receiving harvesting crop, a separating system for threshing the harvested crop to produce grain and residue, at least one of a yield monitor or a loss monitor, a crop cleaning system for separating the grain from the residue, an automated chopper pan positioned below the residue chopper, a residue chopper for chopping the separated residue, the automated chopper pan having adjustable perforations, and a controller coupled to the at least one of the yield monitor or the loss monitor. The controller is configured to determine at least one of throughput from the yield monitor or loss from the loss monitor, compare the at least one of throughput or loss to respective throughput thresholds or loss thresholds, and control the automated chopper pan to adjust the perforations based on the threshold comparison.

Another embodiment includes a method for controlling a combine having a feeder housing for receiving harvesting crop, a separating system for threshing the harvested crop to produce grain and residue, at least one of a yield monitor or a loss monitor, a crop cleaning system for separating the grain from the residue, a residue chopper for chopping the separated residue, an automated chopper pan positioned below the residue chopper, the automated chopper pan having adjustable perforations, and a controller coupled to the at least one of the yield monitor or the loss monitor. The method includes determining at least one of throughput from the yield monitor or loss from the loss monitor, comparing the at least one of throughput or loss to respective throughput thresholds or loss thresholds, and controlling the automated chopper pan to adjust the perforations based on the threshold comparison.

BRIEF DESCRIPTION OF THE FIGURES

FIG. 1D is an overhead view of an automated chopper pan in the combine residue system with the perforations partially open, according to an embodiment of the invention.

DETAILED DESCRIPTION OF THE INVENTION

Aspects of the invention provide methods and systems for operating a combine to automatically control a chopper pan. Generally, the system determines at least one of grain throughput and grain loss, and controls the size of perforations in the chopper pan to maximize throughput while minimizing loss.

The terms "grain," "straw," and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, material other than grain (MOG) or straw. Incompletely threshed crop material is referred to as "tailings." Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1A:
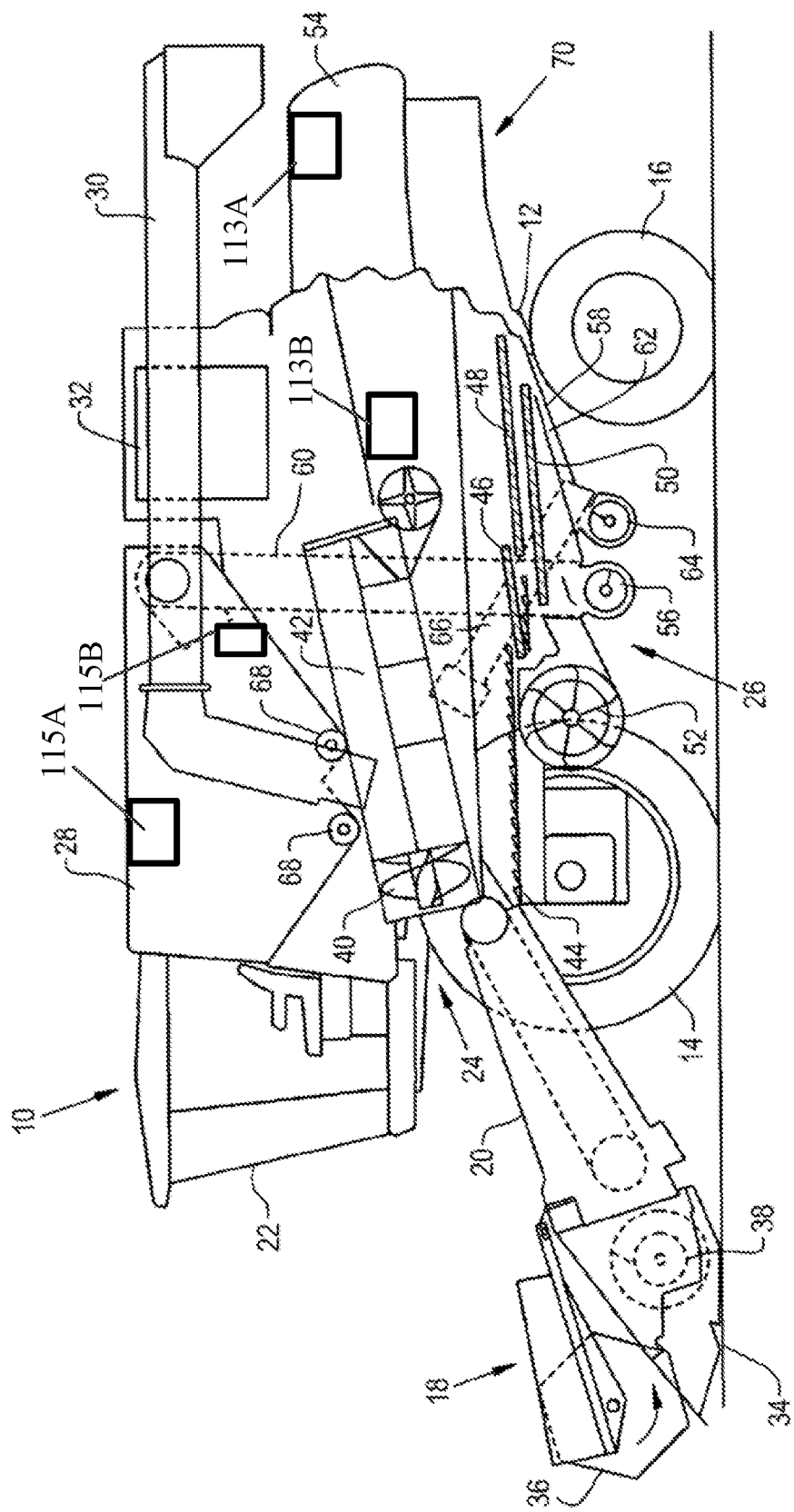
FIG. 1A is a side view of a combine, according to an embodiment of the invention.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 includes a chopper 114, a chopper pan 116, counter knives 117, a windrow door 104 and a residue spreader 110. When combine 10 operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing through the passageway created by the open windrow door.

The combine also monitors both yield and loss of the grain to ensure efficient operation. Loss is generally defined as a percentage of grain lost. Loss includes grain that is accidentally blown by fan 52 into the straw hood 54 and ejected from the combine rather than collected in the tank. In contrast, yield is generally defined as the amount of grain collected in the tank (e.g. bushels).

Loss may be monitored by a loss sensor (also referred to herein as a "loss monitor") that could be positioned within straw hood 54 of residue system 70 (see FIG. 1A) as loss sensor 113A, and/or positioned near the output of threshing/separating system 24 as loss sensor 113B. Loss sensor 113A may be an acoustic sensor that detects certain audible frequencies that are associated with grain hitting the metal frame of straw hood 54. For example, grain (e.g. seeds) may make a distinctive sound as compared to the chaff when it hits the metal frame of straw hood 54. This signal can be sent to a controller (not shown) that counts the number of hits to compute the amount of grain that is lost during operation of the residue system. Similarly, loss sensor 113B may also be an acoustic sensor that detects certain audible frequencies that are associated with grain hitting structural components as the grain is moved from the rotor towards the residue system. This signal can be sent to a controller (not shown) that counts the number of hits to compute the amount of grain that is lost during operation of the threshing/separating system 24.

Yield may be monitored by a yield sensor 115A (also referred to herein as a "yield monitor") that could be positioned within grain tank 28 (see FIG. 1A). Yield sensor 115A may be an acoustic sensor, radar sensor or the like that measures distance. Generally, yield sensor 115A transmits a signal towards the bottom of grain tank 28 and receives a reflection signal from the grain. A controller uses the roundtrip travel time of the signal to compute the distance from the sensor to the pile of grain. The controller uses this distance to determine how much grain is in grain tank 28 at any given time. As the grain pile grows, the roundtrip travel time of the signal will decrease indicating that the grain is getting closer to the top of grain tank 28.

In another example, yield sensor 115B may be a switch (e.g. strain gauge, impact plate, pressure sensor). Rather than being positioned at the top of grain tank 28 like the distance sensor shown in FIG. 1A, the pressure based yield sensor 115B may be positioned at the top of grain elevator 60. When grain exits the top of grain elevator 60, the yield sensor 115B senses the amount of grain hitting it and calculates the mass of grain that is passing through the elevator over time to determine yield. Other factors (e.g. header width, distance traveled, etc.) may also be taken into consideration when computing yield using such a pressure sensor.

Throughput is yet another metric that can be determined based on yield. As described above, yield is determined based on signals transmitted and received by yield sensor 115A or 115B. Throughput is the amount of crop being processed by the combine at a given time. Generally, throughput can be computed by measuring yield over a time period. For example, if the yield sensor detects that grain tank 28 holds 10 bushels at time T, and then detects that grain tank 28 holds 10.1 bushels at time T+6 seconds, the throughput can be determined as 1 bushel per minute. In another example, if the yield sensor detects that grain tank 28 holds 10 bushels at time T, and then detects that grain tank 28 holds 10.3 bushels at time T+6 seconds, the throughput can be determined as 3 bushel per minute.

Both loss and throughput are factors that may be beneficial to controlling automated chopper pan 116 located in the residue system 70. If automated chopper pan 116 has fully closed perforations during harvesting, problems could occur. For example, at high throughput, the chopper may eject grain from the combine (e.g. the grain cannot fall to the cleaning system). In contrast, if automated chopper pan 116 has fully open perforations during harvesting, other problems could occur. For example, if throughput is high, too much reside falls through the pan and overwhelms the cleaning system.

Figure 1B:
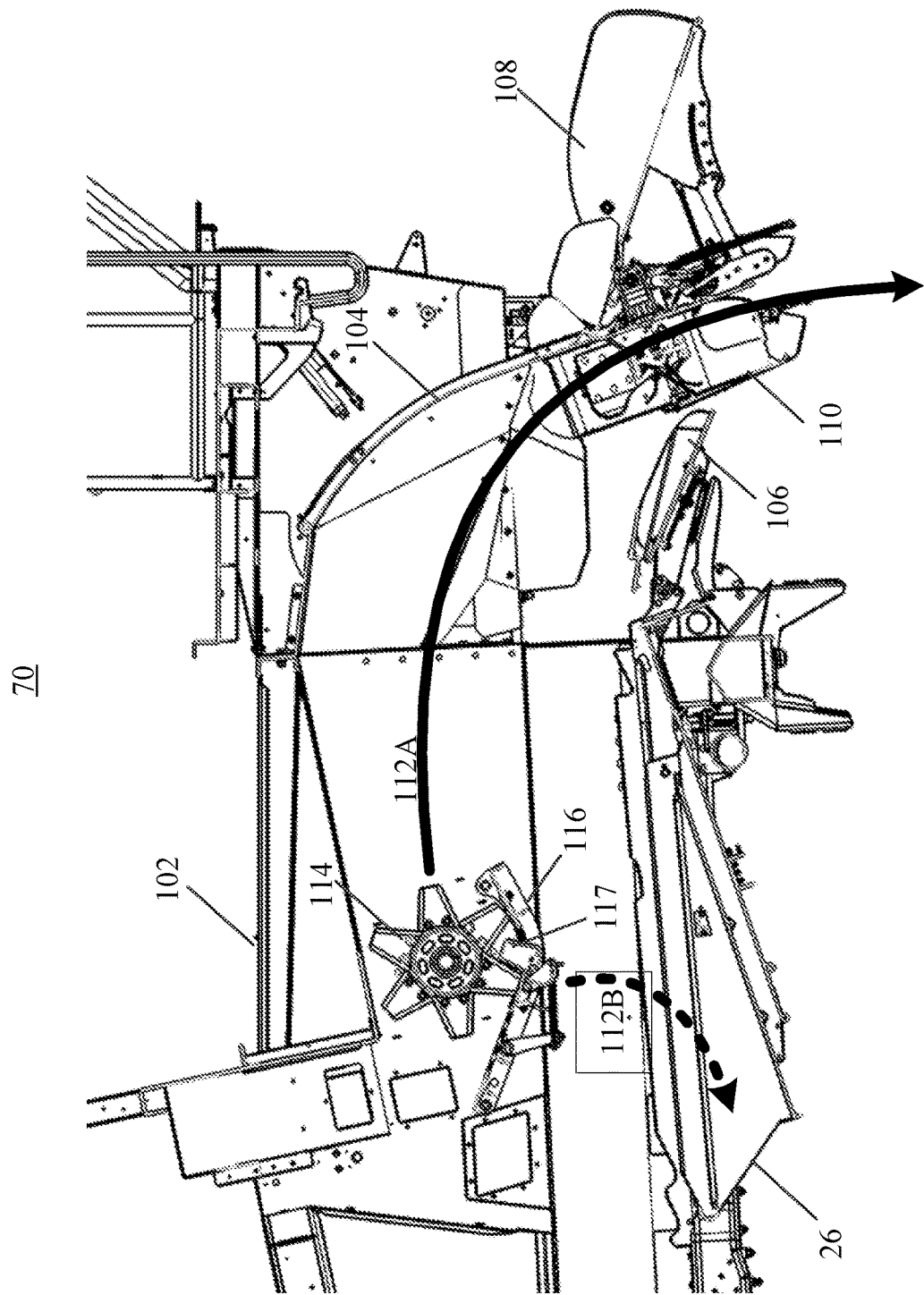
FIG. 1B is a section view of a combine residue system, according to an embodiment of the invention.

For sake of clarify, details of residue system 70 are shown in FIG. 1B-1E. For example, as shown in FIG. 1B, residue system 70 includes a bottom wall 100, a top wall 102, side walls (not shown for clarity), a windrow door 104, a spreader chute 106, a windrow chute 108, residue spreader 110, chopper 114 and automated chopper pan 116.

Figure 1C:
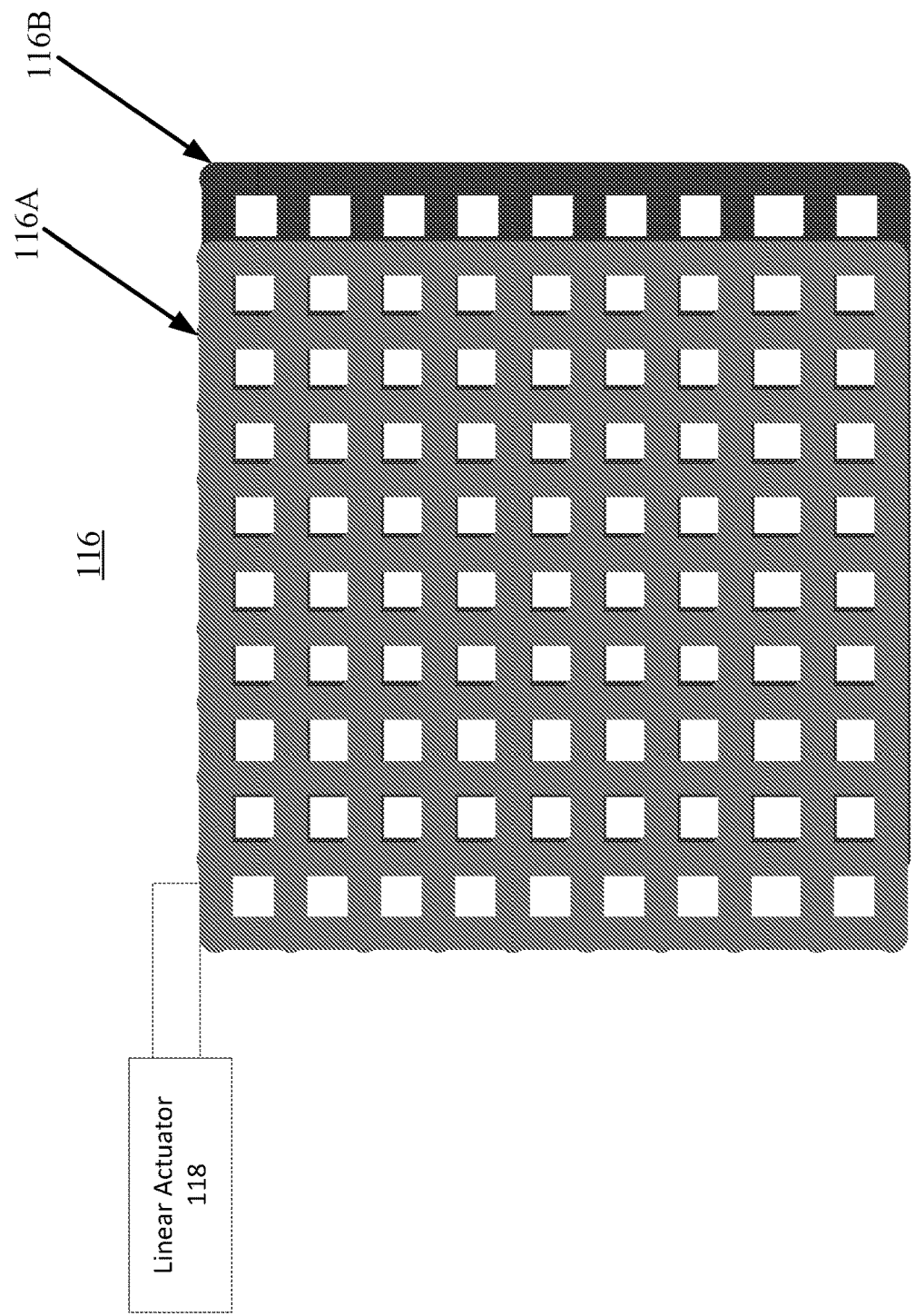
FIG. 1C is an overhead view of an automated chopper pan in the combine residue system with the perforations fully open, according to an embodiment of the invention.

Although not shown in FIG. 1B or 1C, windrow door 104, residue spreader 110, chopper 114 and automated chopper pan 116 are electrically connected to a controller (e.g. programmable logic controller, micro-controller, etc.) located in the combine. The controller is programmable by the operator of the combine through a user (e.g. operator) interface, or through a remote computer (see FIG. 3). The operator, for example, enters commands through the user interface. In response to these commands, the controller sends control signals to the various actuators of residue handling system 70 including the automated chopper pan 116.

As described above, the residue system may be configured in a spreading mode or a windrow mode. For example, in spreading mode, the combine controller controls the windrow door actuator to position windrow door 104 (e.g. hinged door) in the closed position and controls the motors to rotate the spreader wheels. This closed configuration prevents residue from exiting the residue system through windrow chute 108. When windrow door 104 is in this closed position, the residue that is previously processed by the chopper 114 and counter knives 117 travels along path 112A and is ejected from the combine through spreading chute 106 and residue spreader 110. Ideally, any remaining grain should fall through perforations (not shown) of automated chopper pan 116 and travel along path 112B into cleaning system 26 to be collected, and all of the MOG should be ejected from the combine along path 112A. However, two undesirable results may also occur. First, some MOG may fall through perforations of automated chopper pan 116 and travel along path 112B into cleaning system 26, thereby increasing the load on cleaning system 26. Second, some grain may be ejected from the combine through spreading chute 106 and residue spreader 110, thereby contributing to grain loss.

Figure 1E:
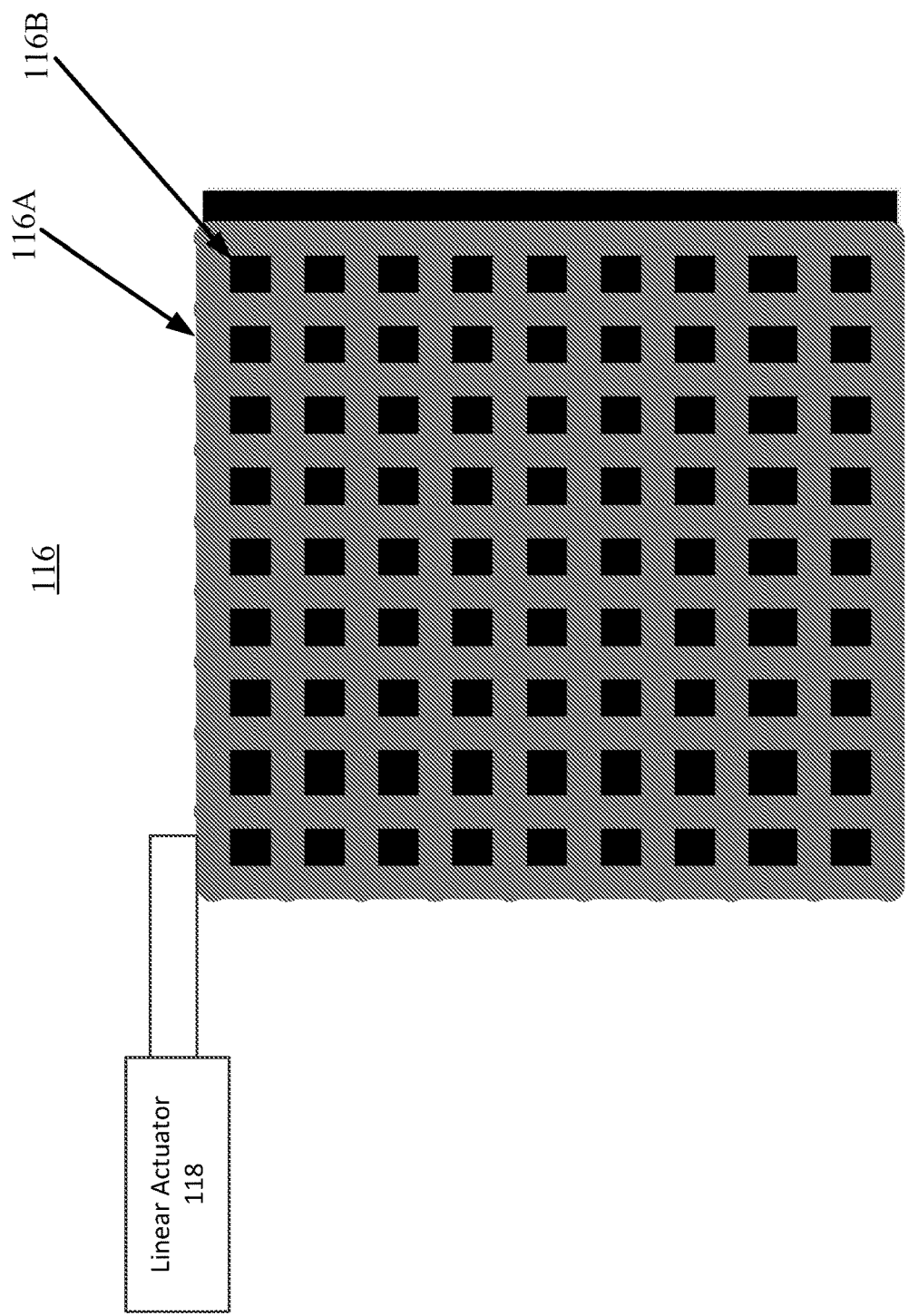
FIG. 1E is an overhead view of an automated chopper pan in the combine residue system with the perforations fully closed, according to an embodiment of the invention.

FIGS. 1C-1E show multiple views of automated chopper pan 116 in various operating states. These include fully open (FIG. 1C), partially open (FIG. 1D) and fully closed (FIG. 1E). These states may be controlled based on loss, throughput or a combination of both. In FIGS. 1C-1E, automated chopper pan 116 includes two perforated grates 116A and 116B that move relative to one another (e.g. grate 116A moves relative to grate 116B). The relative positions of the grate determine the size of the perforations of chopper pan 116 which allows the grain to fall into the combine cleaning system. In these examples, two grates are shown, where grate 116A is positioned by linear actuator 118 relative to grate 116B. It should be noted, however, that both grates could be movable, and that more than one two grates may also be utilized.

In one example, when controlled based on loss and throughput, automated chopper pan 116 may be operating in the fully open position shown in FIG. 1C while throughput and loss are fairly low (e.g. grate 116A is positioned by linear actuator 118 relative to grate 116B such that the perforations are fully opened). However, if throughput increases above a threshold, the system may then partially or fully close the perforations (see FIGS. 1D and 1E) such that less residue falls through to the cleaning system, thereby reducing the load on the cleaning system. However, if loss begins to increase due to this operating state, the system may then partially or fully open the perforations again to reduce loss to an acceptable level. The perforation sizes can be controlled to effectively minimize load on the cleaning system while also minimizing loss. Further operation of chopper pan 116 is described with respect to the flowcharts in FIGS. 5A-5D.

Figure 2:
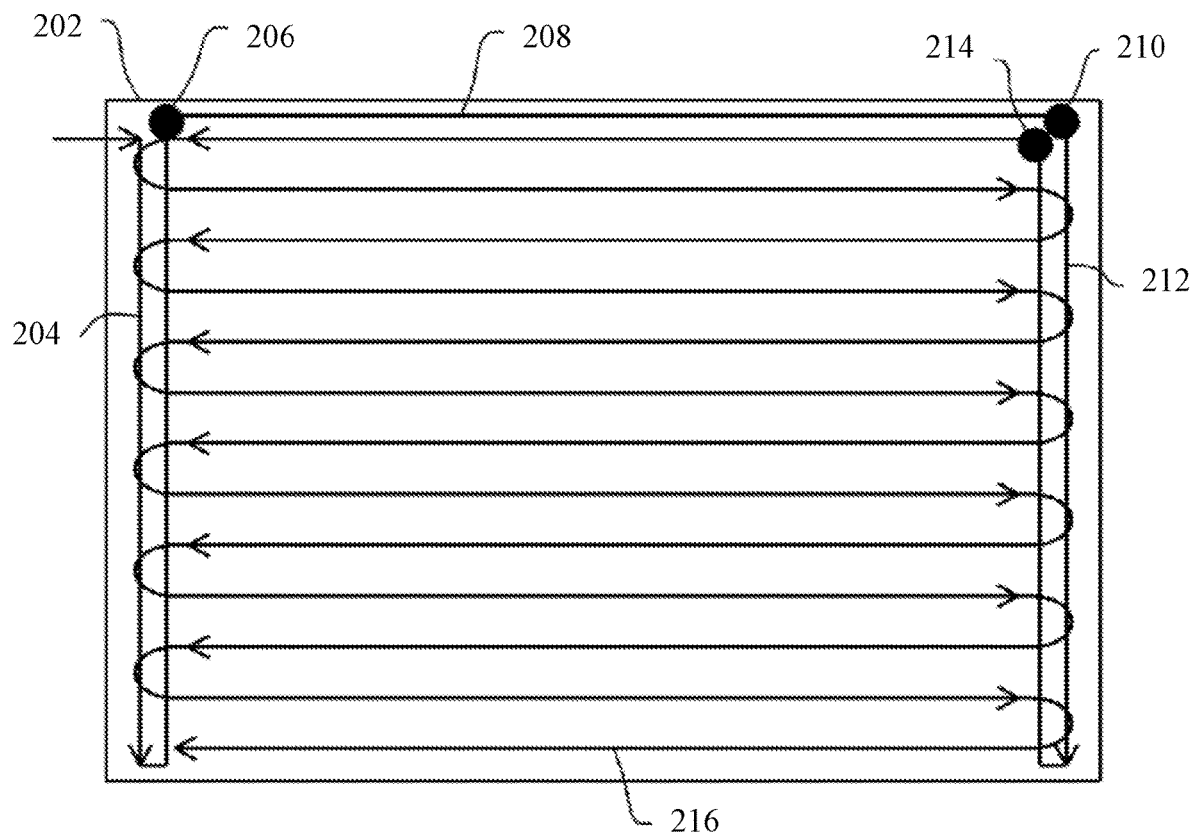
FIG. 2 is a typical path traversed by the combine during harvesting, according to an embodiment of the invention.

The pathways shown in FIG. 2 are typical for a plot of land 202 that is to be harvested. Typically, as harvesting is performed, the combine may employ residue system 70 to perform spreading and/or windrowing of the harvested crops at different locations of the field. For example, the combine may start performing spreading along path 204. Once the combine reaches point 208, a turn is made and spreading is performed along path 206. Once the combine reaches point 210, a turn is made and spreading is performed along path 212. Finally, once the combine reaches point 214, a turn is made and windrowing is performed in a zig-zag pattern along path 216.

During harvesting (e.g. while traveling the pathways shown in FIG. 2), the combine increases or decreases the size of the perforations in pan 116. The decision increase/decrease the perforations may be based on various factors, including but not limited to throughput, loss, yield, land grade, location of water features, location of roadways, etc. In addition, the operator, or any other person (e.g. farm owner, farm manager, etc.) can set the perforations states that correspond to certain threshold (e.g. throughput and/or loss) values. The combine automatically controls automated chopper pan 116 based on these set states.

Figure 3:
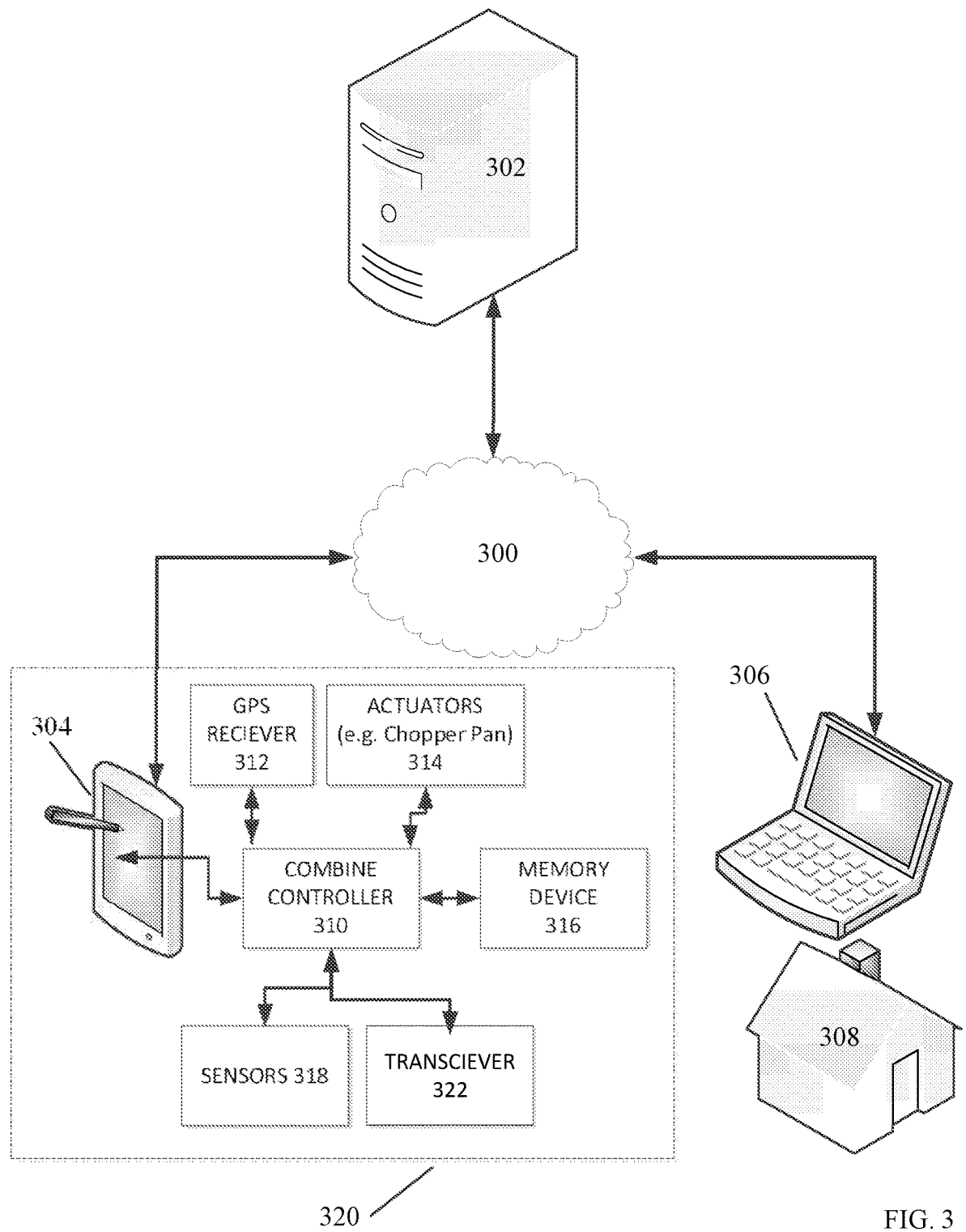
FIG. 3 is a system view of network based communication between the combine controller, a remote personal computer and a server, according to an embodiment of the invention.

Creating the perforation states of the chopper pan is a process that can be performed while in the combine via a user interface, or while remote from the combine via a personal computer (PC). FIG. 3 shows an example of a system for controlling the combine. The system includes an interconnection between a control system 320 of combine 10, a remote PC 306 at location 308, and a remote server 302 through network 300 (e.g. Internet). It should be noted that combine 10 does not have to be connected to other devices through a network. The controller of combine 10 can be a standalone system that receives operating instructions (e.g. throughput/loss thresholds and perforation states of the chopper pan) through a user interface, or through a removable memory device (e.g. Flash Drive).

Prior to operating combine 10, an operator designates perforation states based on predetermined loss and/or throughput levels. In one example, the operator uses interface 304 of the combine control system or PC 306 located at remote location 308. Interface 304 and PC 306 allow the operator to view locally stored parameters from memory device 316 and/or download parameters via transceiver 322 (e.g. WiFi, Bluetooth, Cellular, etc.) from server 302 through network 300. The operator may select (via Interface 304 or PC 306) appropriate perforation states based on throughput/loss thresholds based on various factors including, but not limited to the type of crop to be harvested by the combine. Once the thresholds and states are selected, the operator can begin harvesting. Combine controller 312 then controls actuators 314 (e.g. chopper pan 116) based on the thresholds. For example, sensors 318 (e.g. yield and loss sensors) may be used during harvesting to compare throughput and/or loss to the thresholds in order to automatically control chopper pan 116. Harvesting may also be tracked and aided by GPS receiver 312.

Figure 4:
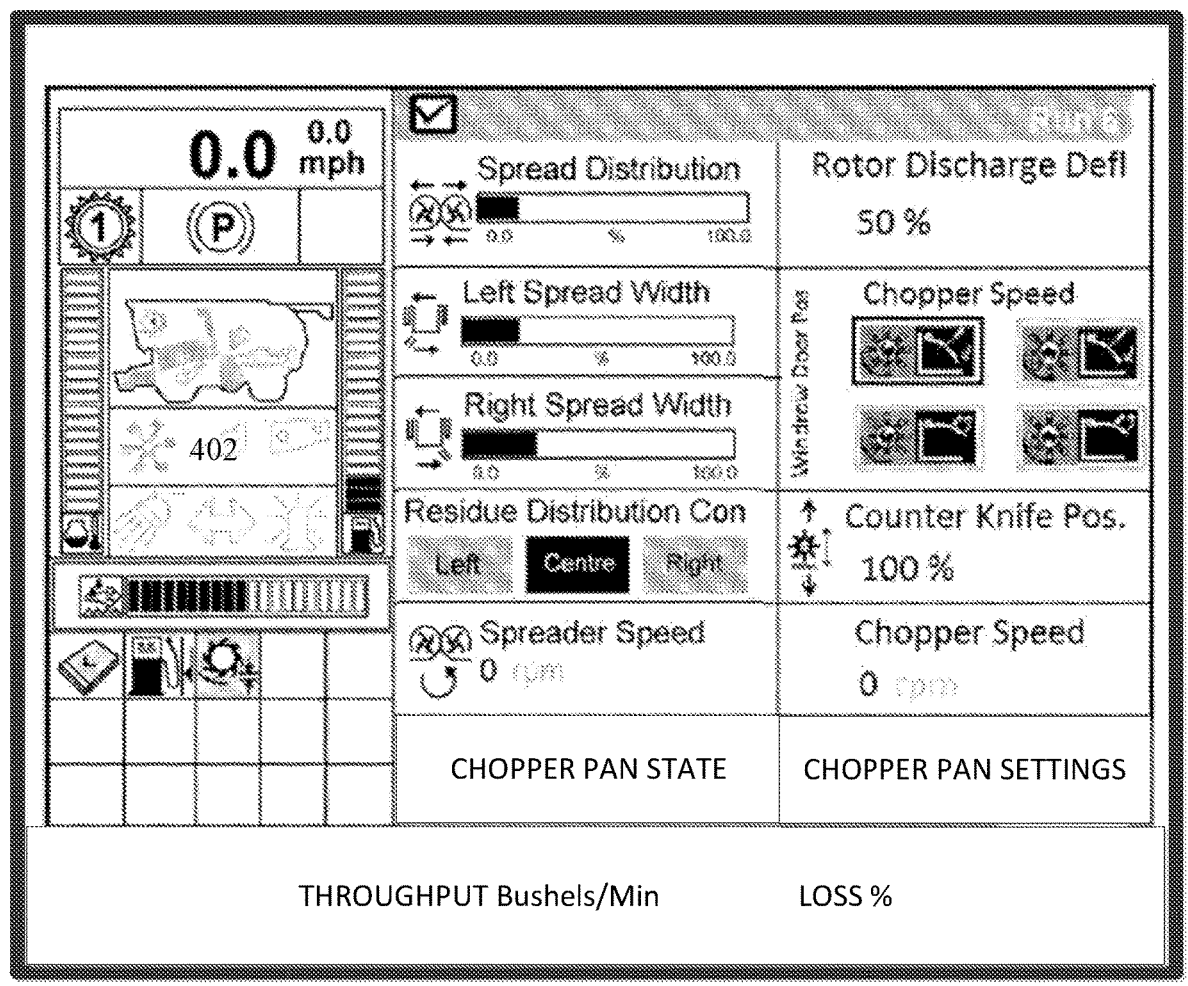
FIG. 4 is an illustration of a user interface for monitoring and controlling the combine, according to an embodiment of the invention.

An example of interface 304 is shown in FIG. 4 wherein various parameters and data are displayed to the operator through a graphical user interface (GUI) 400. These may include a view of the map 402 with designated zones, land grade (not shown), current operational mode (spreading/windrow modes), and operational parameters/states for the spreader wheels, chopper, automated chopper pan, counter knives, windrow door, etc. These parameters may be set or changed by the operator prior to harvesting or during harvesting. For example, the operator can use a stylus or their finger on the touchscreen to set chopper pan states, etc.

FIGS. 5A-5D show flowcharts for controlling the automated chopper pan 116 based on determined loss and/or throughput of the combine during harvesting.

Figure 5A:
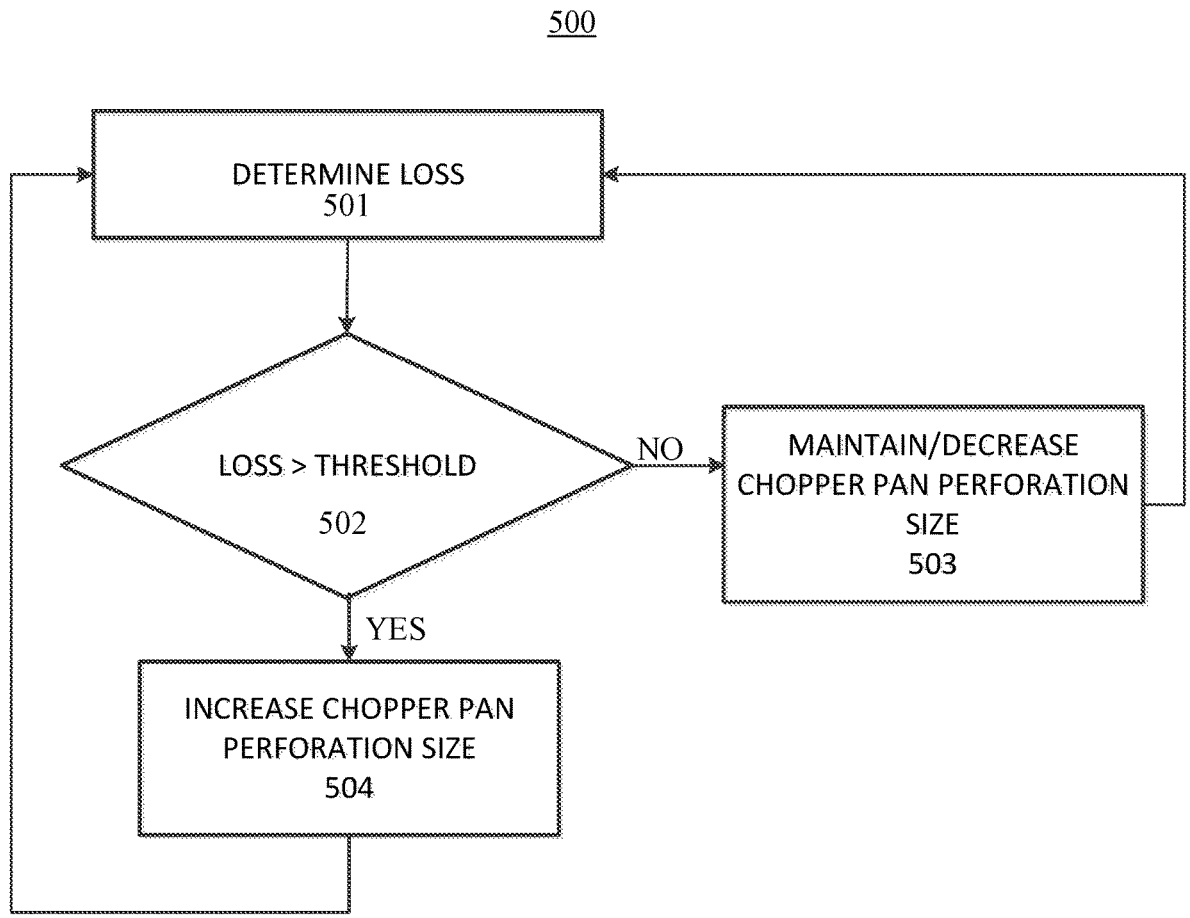
FIG. 5A is a flowchart of steps for controlling the chopper pan based on grain loss, according to an embodiment of the invention.

For example, as shown in FIG. 5A, the automated chopper pan 116 is controlled based on grain loss. In step 501, the controller measures the loss. In step 502, if the controller determines that loss is less than or equal to the threshold (e.g. not much grain is being ejected by the chopper), then in step 503, the controller either maintains or decreases the chopper pan perforation size to maintain or reduce the processing load on the cleaning system. For example, if the chopper pan is a fully open state (see FIG. 1C where grate 116A is positioned by linear actuator 118 relative to grate 116B such that the perforations are fully opened), then the controller might control the chopper pan to enter the partially open state (see FIG. 1D where grate 116A is positioned by linear actuator 118 relative to grate 116B such that the perforations are partially opened). In contrast, in step 502, if the controller determines that loss is greater than the threshold (e.g. a lot of grain is being ejected by the chopper), then in step 504, the controller increases the chopper pan perforation size to decrease loss. For example, if the chopper pan is a partially open state (FIG. 1D), then the controller might control the chopper pan to enter the fully open state (FIG. 1C).

Figure 5B:
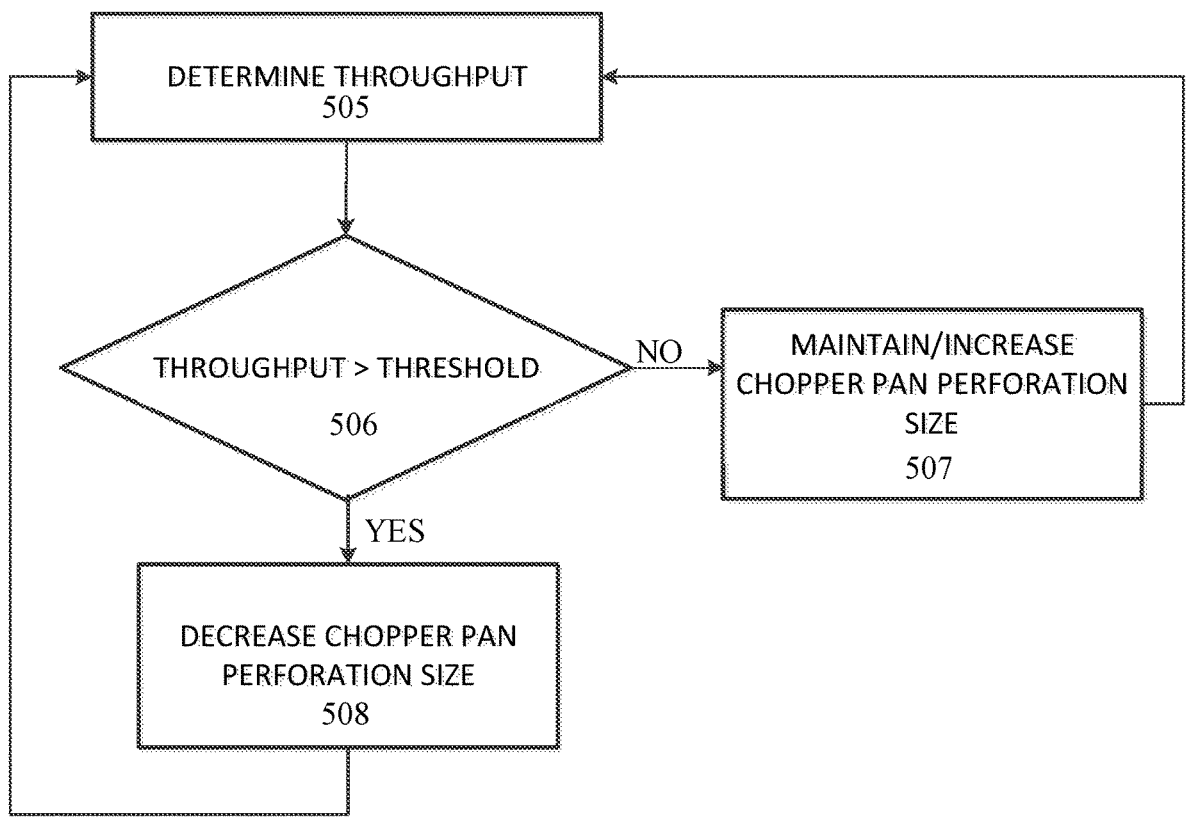
FIG. 5B is a flowchart of steps for controlling the chopper pan based on grain throughput, according to an embodiment of the invention.

In another example, as shown in FIG. 5B, the automated chopper pan 116 is controlled based on throughput. In step 505, the controller measures the throughput. In step 506, if the controller determines that throughput is less than or equal to the threshold (e.g. not much residue is being processed by the chopper), then in step 507, the controller either maintains or increases the chopper pan perforation size to maintain or increase the processing load on the cleaning system. For example, if the chopper pan is in a fully closed state (see FIG. 1E where grate 116A is positioned by linear actuator 118 relative to grate 116B such that the perforations are fully closed), then the controller might control the chopper pan to enter the partially open state (FIG. 1D). In contrast, in step 505, if the controller determines that throughput is greater than the threshold (e.g. a lot of residue is being processed by the chopper), then in step 507, the controller decreases the chopper pan perforation size to decrease processing load on the cleaning system. For example, if the chopper pan is a partially open state (FIG. 1D), then the controller might control the chopper pan to enter the fully closed state (FIG. 1E).

Figure 5C:
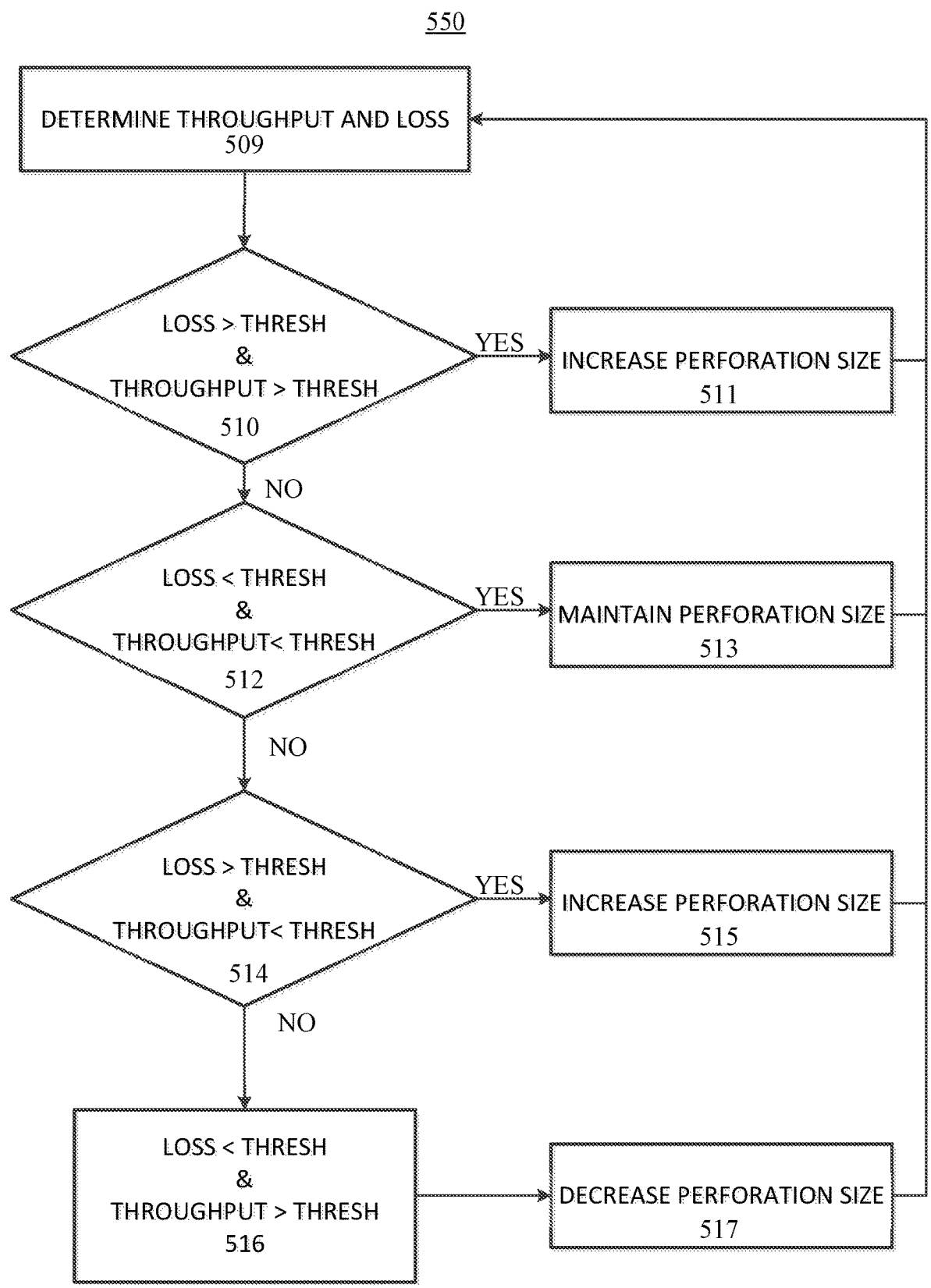
FIG. 5C is a flowchart of steps for controlling the chopper pan based on grain loss and grain throughput, according to an embodiment of the invention.

In another example, as shown in FIG. 5C, the automated chopper pan 116 is controlled based on both loss and throughput. In step 509, the controller measures the loss and the throughput. In step 510, if the controller determines that both loss and throughput are greater than their respective thresholds (e.g. throughput and loss are high), then in step 511, the controller increases the chopper pan perforation size to decrease loss which may be more important than the increased processing load on the cleaning system. In step 512, if the controller determines that both loss and throughput are not greater than their respective thresholds (e.g. throughput and loss are low), then in step 513, the controller maintains the chopper pan perforation size. In step 514, if the controller determines that loss is greater than the threshold, and throughput is not greater than the threshold (e.g. high loss and low throughput), then in step 515, the controller increases the chopper pan perforation size to decrease loss. In step 516, if the controller determines that loss is not greater than the threshold, and throughput is greater than the threshold (e.g. high throughput and low loss), then in step 517, the controller decreases the chopper pan perforation size to reduce the load on the cleaning system.

Figure 5D:
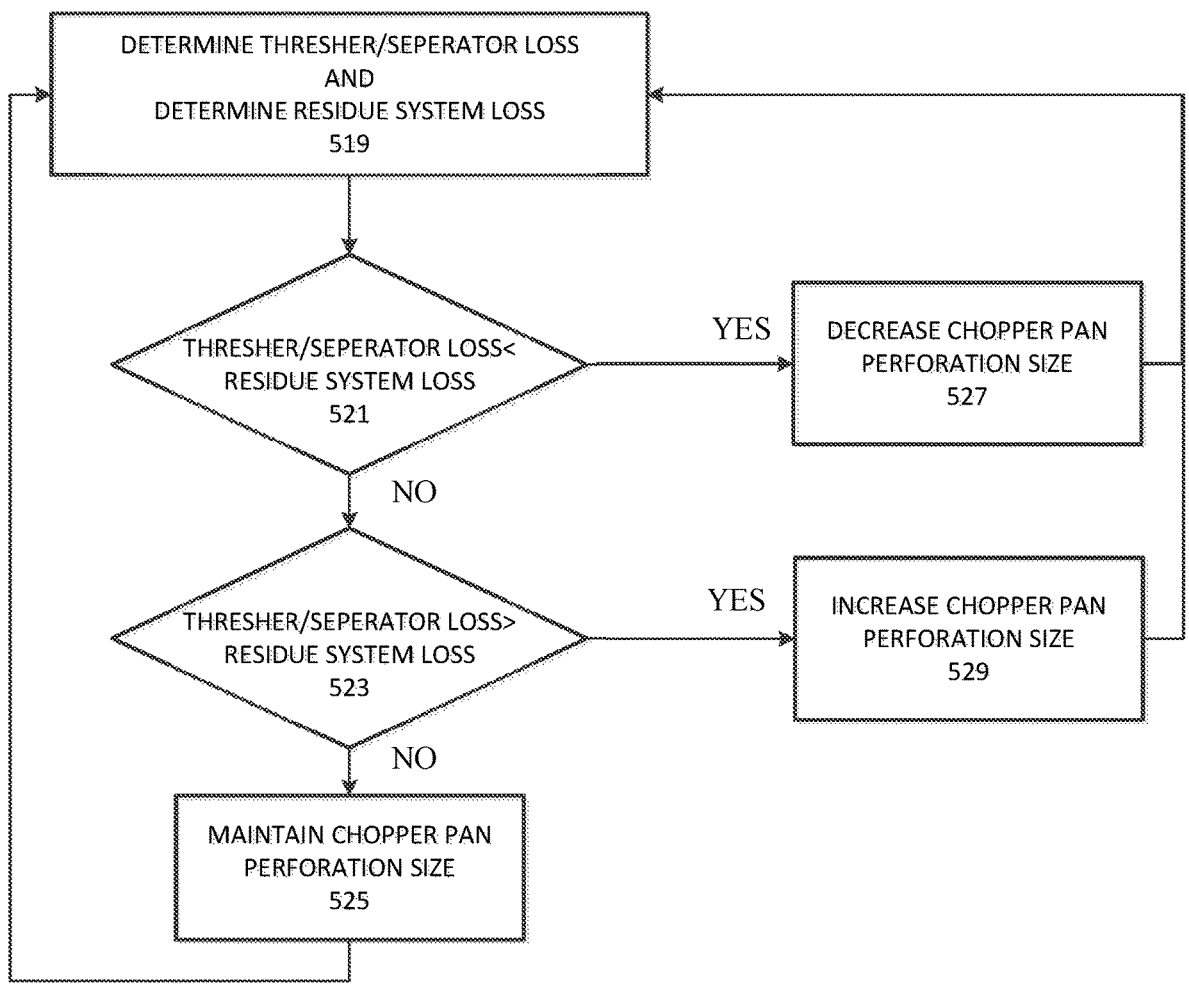
FIG. 5D is a flowchart of steps for controlling the chopper pan based on grain loss from two loss sensors, according to an embodiment of the invention.

In yet another example, as shown in FIG. 5D, the automated chopper pan 116 is controlled based on loss detected from two loss sensors (e.g. loss sensors 113A and 113B). In step 519, the controller measures the loss from both residue loss sensor 113A and thresher/separate loss sensor 113B. In step 521, if the controller determines that loss detected by thresher/separate loss sensor 113B is less than the loss detected by residue loss sensor 113A, then in step 527, the controller decreases the chopper pan perforation size. In step 523, if the controller determines that loss detected by thresher/separate loss sensor 113B is greater than the loss detected by residue loss sensor 113A, then in step 529, the controller increases the chopper pan perforation size. If loss detected by thresher/separate loss sensor 113B is the same as the loss detected by residue loss sensor 113A, then in step 525, the controller maintains the chopper pan perforation size.

It is noted that the control methods described in FIGS. 5A-5D are applicable to various residue system configurations. For example, the control methods described in FIGS. 5A-5D may be implemented in residue system 70 of FIG. 1B regardless of whether counter knives 117 are engaged or disengaged when chopper 114 is rotating. The control methods described in FIGS. 5A-5D may also be implemented in other residue systems (not shown) that do not implement counter knives (e.g. systems where the chopper is used as a discharge beater to propel residue from the combine).

Although FIGS. 5A-5D show specific examples of controlling chopper pan 116 based on loss and/or throughput, it should be noted that other examples are possible. The number of thresholds can range from 1 to N, where N is an integer value. In addition, the loss thresholds may be different than the throughput thresholds. In general, the perforations of chopper pan 116 are increased or decreased to reduce loss and processing load on the cleaning system.

Steps 501-529 shown in FIGS. 5A-5D are performed by controller 310 upon loading and executing software code or instructions which are tangibly stored on a tangible computer readable medium 316, such as on a magnetic medium, e.g., a computer hard drive, an optical medium, e.g., an optical disc, solid-state memory, e.g., flash memory, or other storage media known in the art. Thus, any of the functionality performed by the controller 310 described herein, such as the steps shown in FIGS. 5A-5D, are implemented in software code or instructions which are tangibly stored on a tangible computer readable medium. Upon loading and executing such software code or instructions by the controller 310, the controller 310 may perform any of the functionality of the controller 310 described herein, including the steps shown in FIGS. 5A-5D described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the invention is illustrated and described herein with reference to specific embodiments, the invention is not intended to be limited to the details shown. Rather various modifications may be made in the details within the scope and range of equivalence of the claims and without departing from the invention.

What is claimed is:

1. A combine comprising:
    a feeder housing for receiving harvested crop;
    a separating system for threshing the harvested crop to produce grain and residue;
    at least one of a yield monitor or a loss monitor;
    a crop cleaning system for separating the grain from the residue;
    a residue chopper for chopping the separated residue;
    an automated chopper pan positioned below the residue chopper, the automated chopper pan having adjustable perforations; and
    a controller coupled to the at least one of the yield monitor or the loss monitor, and configured to:
        determine at least one of throughput from the yield monitor or loss from the loss monitor,
        compare the at least one of throughput or loss to respective throughput thresholds or loss thresholds, and
        control the automated chopper pan to adjust the perforations based on the threshold comparison.

2. The combine of claim 1, wherein the controller is further configured to control the automated chopper pan to fully open or fully close the perforations based on the comparison.

3. The combine of claim 1, wherein the controller is further configured to control the automated chopper pan to partially open or partially close the perforations based on the comparison.

4. The combine of claim 1, wherein the controller is further configured to control the automated chopper pan to open the perforations in response to the loss being greater than a loss threshold.

5. The combine of claim 1, wherein the controller is further configured to control the automated chopper pan to close the perforations in response to the loss being less than a loss threshold.

6. The combine of claim 1, wherein the controller is further configured to control the automated chopper pan to close the perforations in response to the throughput being greater than a throughput threshold.

7. The combine of claim 1, wherein the controller is further configured to control the automated chopper pan to open the perforations in response to the throughput being less than a throughput threshold.

8. The combine of claim 1, wherein the controller is further configured to:
    control the automated chopper pan to increase a size of the perforations in response to the loss and throughput being greater than a loss threshold and a throughput threshold,
    control the automated chopper pan to maintain a size of the perforations in response to the loss and throughput being less than the loss threshold and the throughput threshold,
    control the automated chopper pan to increase a size of the perforations in response to the loss being greater than the loss threshold and throughput being less than the throughput threshold, and
    control the automated chopper pan to decrease a size of the perforations in response to the loss being less than the loss threshold and throughput being greater than the throughput threshold.

9. The combine of claim 1, wherein the automated chopper pan includes:
    a first grate; and
    a second grate movable by an actuator relative to the first grate to open or close the perforations of the automated chopper pan.

10. The combine of claim 9, wherein the controller is further configured to control the actuator to move the second grate relative to the first grate to increase or decrease a size of the perforations of the automated chopper pan.

11. A method for controlling a combine including a feeder housing for receiving harvesting crop, a separating system for threshing the harvested crop to produce grain and residue, at least one of a yield monitor or a loss monitor, a crop cleaning system for separating the grain from the residue, a residue chopper for chopping the separated residue, an automated chopper pan positioned below the residue chopper, the automated chopper pan having adjustable perforations, and a controller coupled to the at least one of the yield monitor or the loss monitor, the method comprising:
    determining, by the controller, at least one of throughput from the yield monitor or loss from the loss monitor;
    comparing, by the controller, the at least one of throughput or loss to respective throughput thresholds or loss thresholds; and
    controlling, by the controller, the automated chopper pan to adjust the perforations based on the threshold comparison.

12. The method of claim 11, further comprising controlling, by the controller, the automated chopper pan to fully open or fully close the perforations based on the comparison.

13. The method of claim 11, further comprising controlling, by the controller, the automated chopper pan to partially open or partially close the perforations based on the comparison.

14. The method of claim 11, further comprising controlling, by the controller, the automated chopper pan to open the perforations in response to the loss being greater than a loss threshold.

15. The method of claim 11, further comprising controlling, by the controller, the automated chopper pan to close the perforations in response to the loss being less than a loss threshold.

16. The method of claim 11, further comprising controlling, by the controller, the automated chopper pan to open the perforations in response to the throughput being less than a throughput threshold.

17. The method of claim 11, further comprising controlling, by the controller, the automated chopper pan to close the perforations in response to the throughput being greater than a throughput threshold.

18. The method of claim 11, further comprising:
controlling, by the controller, the automated chopper pan to increase a size of the perforations in response to the loss and throughput being greater than a loss threshold and a throughput threshold;
controlling, by the controller, the automated chopper pan to maintain a size of the perforations in response to the loss and throughput being less than the loss threshold and the throughput threshold;
controlling, by the controller, the automated chopper pan to increase a size of the perforations in response to the loss being greater than the loss threshold and throughput being less than the throughput threshold; and
controlling, by the controller, the automated chopper pan to decrease a size of the perforations in response to the loss being less than the loss threshold and throughput being greater than the throughput threshold.

19. The method of claim 11, further comprising controlling, by the controller an actuator to move a second grate relative to a first grate to open or close the perforations of the automated chopper pan.

20. The method of claim 19, further comprising controlling, by the controller, the actuator to move the second grate relative to the first grate to increase or decrease a size of the perforations of the automated chopper pan.

* * * * *